D. CRANE.
Grain and Straw Lifter.
No. 160,576. Patented March 9, 1875.
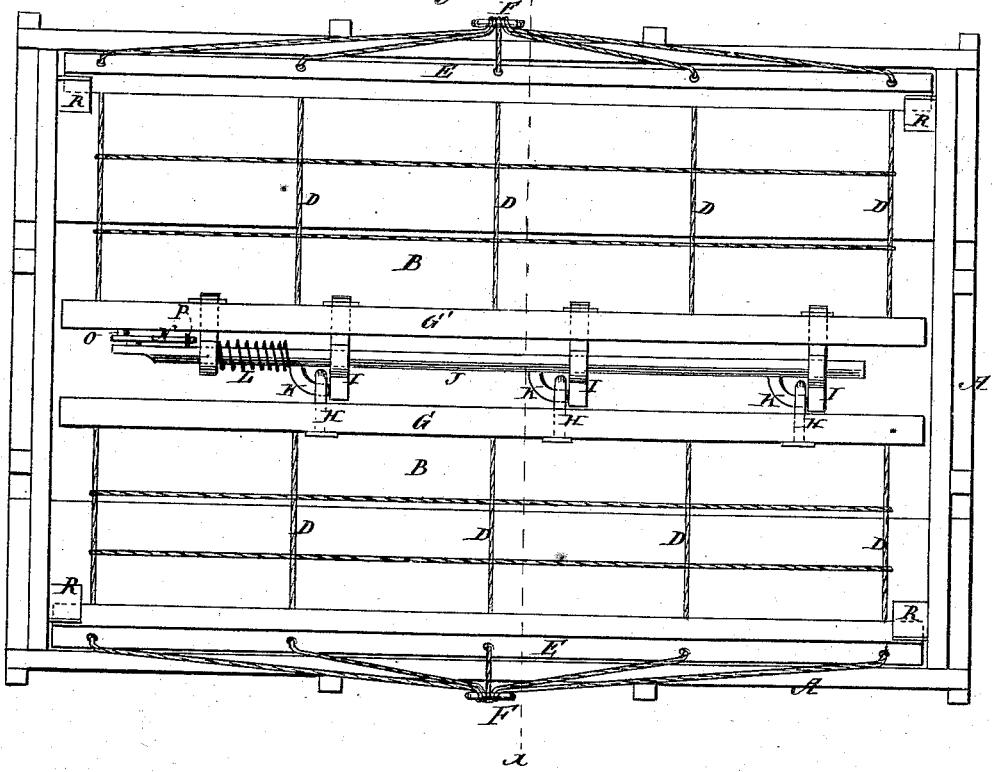
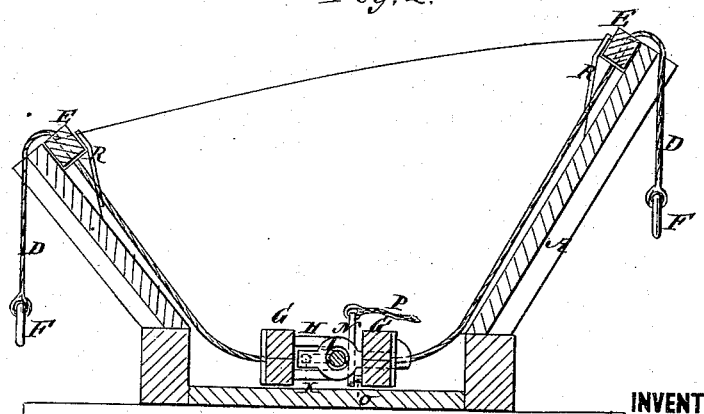
WITNESSES:
E. Wolff
A. F. Terry
INVENTOR:
D. Crane
BY
Munn & Co
ATTORNEYS.

UNITED STATES PATENT OFFICE.

DONALD CRANE, OF KNIGHT'S LANDING, CALIFORNIA.

IMPROVEMENT IN GRAIN AND STRAW LIFTERS.

Specification forming part of Letters Patent No. 160,576, dated March 9, 1875; application filed December 28, 1874.

*To all whom it may concern:*

Be it known that I, DONALD CRANE, of Knight's Landing, in the county of Yolo and State of California, have invented a new and useful Improvement in Grain and Straw Lifter, of which the following is a specification:

The invention will first be fully described, and then pointed out in the claim.

In the accompanying drawing, Figure 1 is a top view of a wagon having my improved lifter arranged as when in use. Fig. 2 is a cross-section of Fig. 1, taken on the line $x\ x$.

Similar letters of reference indicate corresponding parts.

A represents the wagon, which may be of any kind, either what is known as a "header-wagon" or any other suitable farm-wagon. B is the lifter. This lifter is composed of ropes interlaced, and forming a kind of net, substantially as seen in the drawing, made in two parts, and attached to timbers or bars, and divided in the middle, as seen in the drawing. The cross-ropes D are passed through the outside bars E, where they are confined by knots on each side of the bars, and are brought together on the two outsides, and confined to rings F F, by which the whole load is lifted from the wagon by means of a derrick or crane provided for the purpose. G G' are the two inner bars, one of which, G, is provided with staples H on its outer side. J is a rod, having two or more hooks, K, which are made to enter the staples H. L is a spiral spring on the rod. $m$ are eyes in the bar G', in which the rod plays or moves longitudinally. N is a tripping-lever, which has its fulcrum on the pin $o$ in the bar G', and is pivoted to the end of the rod. To this lever is attached a cord, P, which hangs down beneath the lifter. The lifter is spread over the wagon, substantially as seen in Fig. 1, and the grain, hay, straw, or other material is loaded onto it.

When the load has been transported to the desired place for unloading, a derrick or crane is provided, on the hook of which the rings F F are placed, and the entire load is lifted from the wagon and swung round over the place where it is to be discharged. The cord P is now given a jerk, which moves the rod J lengthwise sufficiently to withdraw the hooks K from the staples H, which allows the parts of the lifter to separate and discharge the load.

The spring L bears against one of the eyes $m$, and against one of the hooks K, and the tendency of the spring is to force the rod back against the eyes with a constant pressure. The rod is stopped by the curved ends of the hooks striking the elongations Q of the eyes.

With this lifter the labor of unloading grain, &c., is greatly lessened and expedited.

I do not limit myself to the precise construction and arrangement of parts shown, as variations may be made in many ways without departing from my invention.

The outside bars E rest on stationary bracket-hooks R, attached to the corners of the wagon.

Having thus described my invention, I claim as new and desire to secure by Letters Patent—

The combination, in a grain and straw lifter, with bars G G', having staples H I, of the spring-rod J, having hooks K, as and for the purpose specified.

DONALD CRANE.

Witnesses:
 ANDREW KNESS,
 JULIUS MARTIN.